(12) United States Patent
Chi

(10) Patent No.: US 11,940,551 B2
(45) Date of Patent: Mar. 26, 2024

(54) RADAR DETECTOR AND INTERFERENCE SUPPRESSION METHOD USING RADAR DETECTOR

(71) Applicant: RichWave Technology Corp., Taipei (TW)

(72) Inventor: Hsiang-Feng Chi, Taipei (TW)

(73) Assignee: RichWave Technology Corp., Taipei (TW)

( * ) Notice: Subject to any disclaimer, the term of this patent is extended or adjusted under 35 U.S.C. 154(b) by 221 days.

(21) Appl. No.: 17/521,862

(22) Filed: Nov. 9, 2021

(65) Prior Publication Data
US 2022/0179040 A1 Jun. 9, 2022

(30) Foreign Application Priority Data
Dec. 9, 2020 (TW) ................................ 109143414

(51) Int. Cl.
*G01S 7/02* (2006.01)
*G01S 7/282* (2006.01)
(Continued)

(52) U.S. Cl.
CPC ............ *G01S 7/0232* (2021.05); *G01S 7/282* (2013.01); *G01S 13/58* (2013.01); *G01S 13/345* (2013.01)

(58) Field of Classification Search
CPC .................................................. G01S 7/0232
See application file for complete search history.

(56) References Cited

U.S. PATENT DOCUMENTS 5,949,368 A * 9/1999 DeCesare ............. G01S 7/2927
342/159
6,768,444 B2 7/2004 Langsford
(Continued)

FOREIGN PATENT DOCUMENTS

| CN | 104925092 | 9/2015 |
| EP | 2546675 | 1/2013 |

(Continued)

OTHER PUBLICATIONS

"Office Action of Korea Counterpart Application", dated Jan. 18, 2024, p. 1-p. 6.

*Primary Examiner* — Hsinchun Liao
(74) *Attorney, Agent, or Firm* — JCIPRNET

(57) ABSTRACT

A radar detector including a radar transmitting device, a radar receiving device, an analog-to-digital converter (ADC), and a digital processing unit, and an interference suppression method using the radar detector are provided. The radar transmitting device transmits a first wireless signal. The radar receiving device receives a second wireless signal to generate an analog reference signal in response to the first wireless signal is subdued from being transmitted, and receives a third wireless signal to generate an analog main signal in response to the first wireless signal is not subdued from being transmitted. The ADC generates a digital reference signal according to the analog reference signal, and generates a digital main signal according to the analog main signal. The digital processing unit adjusts the digital or analog main signal according to the digital reference signal to correspondingly suppress interference components in the digital main signal or in the analog main signal.

20 Claims, 8 Drawing Sheets

(51) Int. Cl.
   *G01S 13/34*   (2006.01)
   *G01S 13/58*   (2006.01)

(56) References Cited

U.S. PATENT DOCUMENTS

| | | | |
|---|---|---|---|
| 2009/0121918 A1 | 5/2009 | Shirai et al. | |
| 2018/0254927 A1* | 9/2018 | Yagil | H04B 3/23 |
| 2020/0145042 A1* | 5/2020 | Kulkarni | G01S 13/103 |

FOREIGN PATENT DOCUMENTS

| | | |
|---|---|---|
| JP | H05240947 | 9/1993 |
| JP | 2011064558 | 3/2011 |
| TW | 201621347 | 6/2016 |
| TW | 202005295 | 1/2020 |
| TW | 202022400 | 6/2020 |
| WO | 9833073 | 7/1998 |

* cited by examiner

RADAR DETECTOR AND INTERFERENCE SUPPRESSION METHOD USING RADAR DETECTOR

CROSS-REFERENCE TO RELATED APPLICATION

This application claims the priority benefit of Taiwanese application no. 109143414, filed on Dec. 9, 2020. The entirety of the above-mentioned patent application is hereby incorporated by reference herein and made a part of this specification.

BACKGROUND

Technical Field

The disclosure relates to a radar detector related to Doppler radar detection technology and an interference suppression method using a radar detector.

Description of Related Art

Currently, Doppler radar detection technology is widely applied in motion detection for vehicle proximity detection, for example. The motion detection technology using the Doppler radar is still subject to many forms of external interference, such as co-channel interference, aliased adjacent-channel interference caused by the use of pulse compression, and baseband/IF-band interference. In particular, some objects themselves emit signals similar to Doppler signals of intermediate-frequency bands (e.g., between 50 Hz and 60 Hz), thus causing the motion detection technology to be interfered by, for example, light wave interference emitted by fluorescent lamps, noise caused by circuit boards themselves in electronic devices, and so on. Therefore, how to suppress or even eliminate interference and noise is one of the issues of the Doppler radar motion detection technology.

SUMMARY

The disclosure provides a radar detector and an interference suppression method using a radar detector, in which interference components in a current environment are detected when a radar wave signal is subdued from being transmitted, and interference components are appropriately deducted from the received signal when the radar wave signal is being transmitted, thereby reducing or suppressing interference in the original signal.

According to an embodiment of the disclosure, a radar detector includes a radar transmitting device, a radar receiving device, an analog-to-digital converter, and a digital processing unit. The radar transmitting device is configured to transmit a first wireless signal. The radar receiving device is coupled to the radar transmitting device. The radar receiving device is configured to receive a second wireless signal to generate an analog reference signal in response to the first wireless signal is subdued from being transmitted, and receive a third wireless signal to generate an analog main signal in response to the first wireless signal is not subdued from being transmitted. The second wireless signal and the third wireless signal include interference components corresponding to interference. An input end of the analog-to-digital converter is coupled to the radar receiving device. The analog-to-digital converter generates a digital reference signal according to the analog reference signal and generates a digital main signal according to the analog main signal. The digital processing unit is configured to generate an interference parameter according to the digital reference signal, and configured to adjust the digital main signal or the analog main signal according to the interference parameter, to correspondingly suppress the interference components in the digital main signal or suppress the interference components in the analog main signal.

According to an embodiment of the disclosure, an interference suppression method using a radar detector is adapted for a radar detector including a radar transmitting device and a radar receiving device. The interference suppression method includes the following. A first wireless signal is subdued from being transmitted, and a second wireless signal is received to generate an analog reference signal. Herein, the first wireless signal is transmitted by the radar transmitting device, and the second wireless signal includes interference components corresponding to interference. A digital reference signal is generated according to the analog reference signal. An interference parameter is generated according to the digital reference signal. The first wireless signal is not subdued from being transmitted, and a third wireless signal is received to generate an analog main signal. Herein, the third wireless signal includes interference components corresponding to the interference. A digital main signal is generated according to the analog main signal. The digital main signal or the analog main signal is adjusted according to the interference parameter to correspondingly suppress the interference components in the digital main signal or suppress the interference components in the analog main signal.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
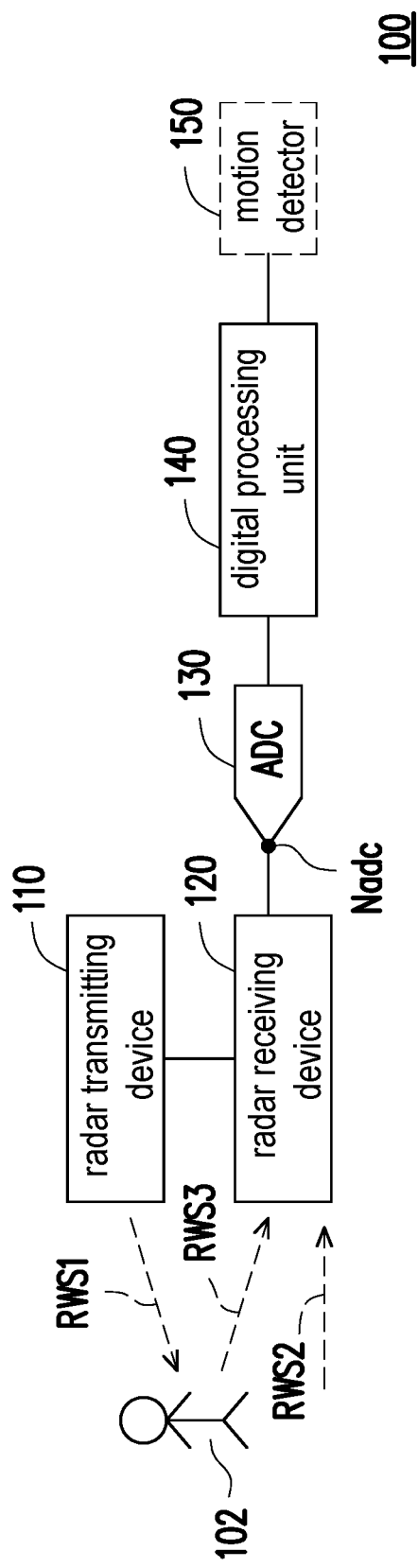
FIG. 1 is a block diagram of a radar detector according to a first embodiment of the disclosure.

FIG. 1 is a block diagram of a radar detector 100 according to a first embodiment of the disclosure. The radar detector 100 may adopt Doppler radar detection technology to detect a motion of an object (e.g., a pedestrian 102). The radar detector 100 mainly includes a radar transmitting device 110, a radar receiving device 120, an analog-to-digital converter (ADC) 130, and a digital processing unit 140.

The radar transmitting device 110 is configured to transmit a first wireless signal (e.g., a radar wave signal RWS1). The radar receiving device 120 is coupled to the radar transmitting device 110. The radar receiving device 120 is configured to receive a second wireless signal (e.g., a radar wave signal RWS2) to generate an analog reference signal when the radar wave signal RWS1 is subdued from being transmitted. Besides, the radar receiving device 120 receives a third wireless signal (e.g., a radar wave signal RWS3) to generate an analog main signal when the radar wave signal RWS1 is not subdued from being transmitted.

Herein, an explanation of "the radar wave signal RWS1 is subdued from being transmitted" and its corresponding realizations are provided. In this embodiment, the realizations of "the radar wave signal RWS1 is subdued from being transmitted" may be multiple. For example, the radar transmitting device 110 could be disabled from transmitting the radar wave signal RWS1 (e.g., when the radar transmitting device 110 is not activated); the radar transmitting device 110 could be controlled to reduce a transmission intensity of the radar wave signal RWS1; or, the radar transmitting device 110 or the radar receiving device 120 could be shielded from the radar wave signal RWS1, so that the radar receiving device 120 receives the radar wave signal RWS2 in a case where it is not easy or not able to receive the radar wave signal RWS1. In this way, the radar wave signal RWS2 is a signal received by the radar receiving device 120 that is barely affected by the radar wave signal RWS1. Therefore, the radar wave signal RWS2 should mainly include interference components corresponding to interference of the current environmental. That is, the radar wave signal RWS2 may be adopted as a basis for generating an analog reference signal, so that the digital processing unit 140 of this embodiment may recognize the interference of the current environment. Relatively, realization of "the radar wave signal RWS1 is not subdued from being transmitted" may also be multiple. For example, the radar transmitting device 110 is enabled to transmit the radar wave signal RWS1 (e.g., when the radar transmitting device 110 is activated); the radar transmitting device 110 is controlled to increase the transmission intensity of the radar wave signal RWS1; or, the radar transmitting device 110 or the radar receiving device 120 is not shielded from the radar wave signal RWS1, so that the radar receiving device 120 receives the radar wave signal RWS3 with sufficient intensity.

The radar detector 100 transmits the radar wave signal RWS1 with the radar transmitting device 110, and the radar wave signal RWS3 is generated by the radar wave signal RWS1 interacted with the environment, and then is received by the radar receiving device 120. For example, when an object (e.g., the pedestrian 102) is present in the environment, the radar wave signal RWS1 is reflected by the object hence to generate the radar wave signal RWS3, and the radar wave signal RWS3 is received by the radar receiving device 120. In other words, the radar wave signal RWS3 may include a reflected signal that is the radar wave signal RWS1 contacting and being reflected from the object. The radar wave signal RWS3 may include motion information (e.g., Doppler frequency offset information) of the object and information of the interference components of the environmental interference, and the radar wave signal RWS2 mainly includes the information of the interference components of the environmental interference.

An input end Nadc of the ADC 130 is coupled to the radar receiving device 120. The ADC 130 generates a digital reference signal according to the analog reference signal, and generates a digital main signal according to the analog main signal. The digital processing unit 140 is coupled to the ADC 130. In addition, the digital processing unit 140 is configured to generate an interference parameter according to the digital reference signal, and is configured to adjust the digital main signal or the analog main signal according to the interference parameter, to correspondingly suppress the interference components in the digital main signal or suppress the interference components in the analog main signal. The radar detector 100 may also selectively include a motion detector 150. The motion detector 150 is coupled to the digital processing unit 140, and determines a motion of the object (e.g., the pedestrian 102) according to the motion information of the object in the signal provided by the digital processing unit 140. For details of each component in FIG. 1, reference may be made to the following embodiments.

Figure 2:
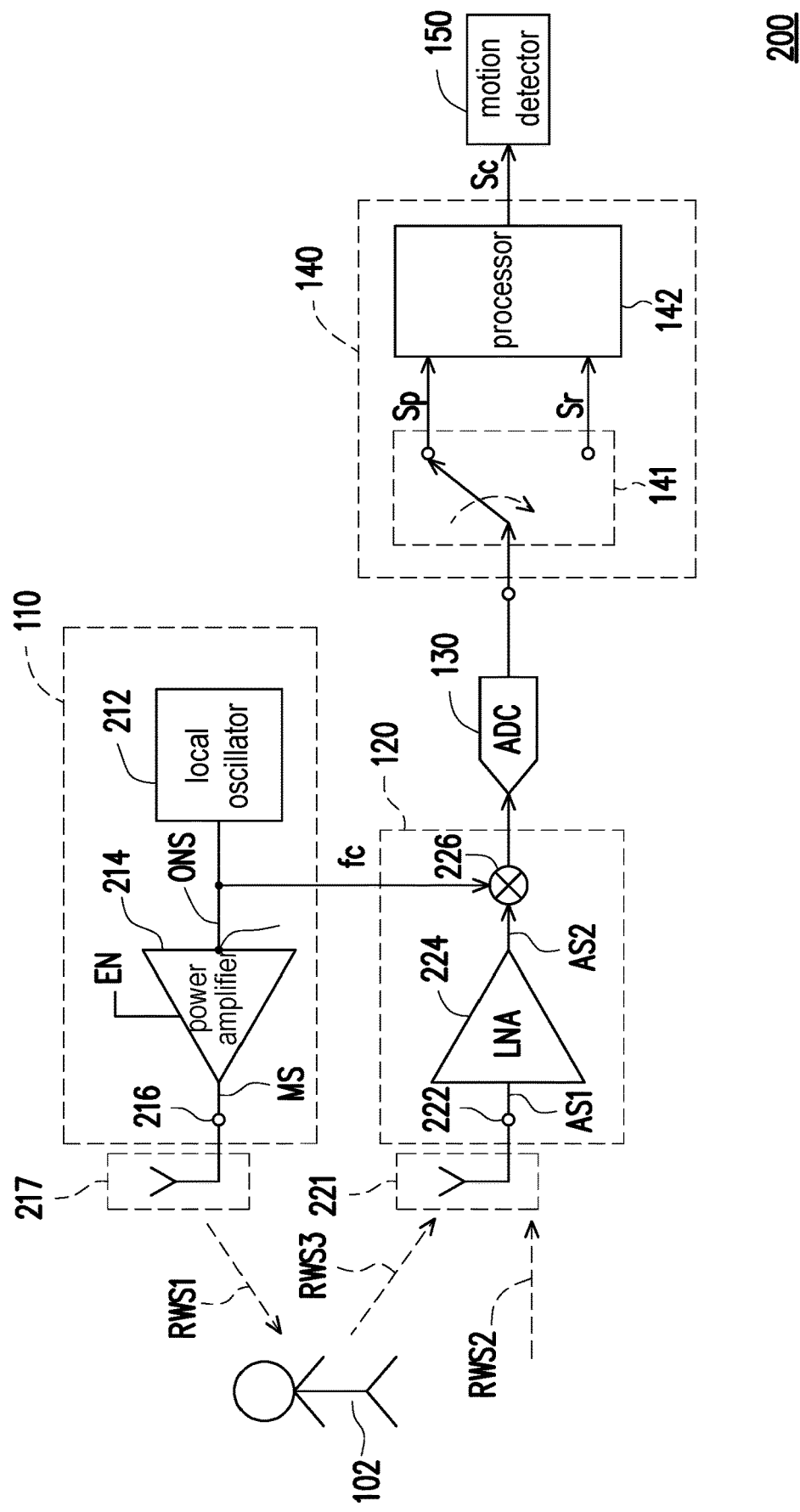
FIG. 2 is a detailed schematic diagram of a radar detector according to a second embodiment the disclosure.

FIG. 2 is a detailed schematic diagram of a radar detector 200 according to a second embodiment of the disclosure. The radar detector 200 in FIG. 2 is a realization of the radar detector 100 in FIG. 1, and the radar detector 200 similarly includes the radar transmitting device 110, the radar receiving device 120, the analog-to-digital converter (ADC) 130, the digital processing unit 140, and selectively the motion detector 150.

The radar transmitting device 110 includes a local oscillator 212, a power amplifier 214, and a transmitting antenna end 216. The local oscillator 212 is configured to generate a radio-frequency carrier signal ONS including a carrier frequency fc. A receiving end N214 of the power amplifier 214 is coupled to the local oscillator 212 to receive the radio-frequency carrier signal ONS. The power amplifier 214 provides a modulation signal MS when the radar wave signal RWS1 is not subdued from being transmitted. The transmitting antenna end 216 is coupled to the power amplifier 214. The transmitting antenna end 216 is coupled to a transmitting antenna 217. The transmitting antenna 217 receives outputs from the power amplifier 214 through the transmitting antenna end 216. The transmitting antenna 217 is configured to convert the modulation signal MS into the radar wave signal RWS1 and transmit the radar wave signal RWS1. In this embodiment, through a control signal EN, it is possible to selectively enable or disable the power amplifier 214, and even adjust an output power of the power amplifier 214, thereby adjusting the transmission intensity of the radar wave signal RWS1.

The radar receiving device 120 mainly includes a receiving antenna end 222, a low noise amplifier 224, and a frequency mixer 226. The receiving antenna end 222 is coupled to a receiving antenna 221. The receiving antenna 221 receives the radar wave signal RWS2 as an analog signal AS1 through the receiving antenna end 222 when the radar wave signal RWS1 is subdued from being transmitted.

Moreover, the receiving antenna 221 receives the radar wave signal RWS3 as the analog signal AS1 through the receiving antenna end 222 when the radar wave signal RWS1 is not subdued from being transmitted. The low noise amplifier 224 is coupled to the receiving antenna end 222. The low noise amplifier 224 is configured to amplify the analog signal AS1 to form an amplified analog signal AS2. The frequency mixer 226 is coupled to the low noise amplifier 224 and the local oscillator 212 in the radar transmitting device 110. The frequency mixer 226 performs downconversion frequency mixing on the amplified analog signal AS2 according to the carrier frequency fc of the radar wave signal RWS1 from the local oscillator 212, to thereby generate the analog reference signal when the radar wave signal RWS1 is subdued from being transmitted, and, generate the analog main signal when the radar wave signal RWS1 is not subdued from being transmitted. The radar receiving device 120 obtains a local oscillator signal with the carrier frequency fc of the radar wave signal RWS1 from the radar transmitting device 110, and performs downconversion frequency mixing on the amplified analog signal AS2 with the carrier frequency fc, which intensifies information substantially at the carrier frequency fc in the amplified analog signal AS2, to thereby facilitate obtaining the radar wave signal RWS3 including the motion information of the object, and intensify a gain of the received information.

The ADC 130 generates a digital reference signal Sr according to the analog reference signal, and generates a digital main signal Sp according to the analog main signal. In the digital processing unit 140 in FIG. 2, a switching device 141 and a processor 142 are shown. Notably herein, the switching device 141 is mainly used to explain that the digital main signal Sp and the digital reference signal Sr are generated respectively when the radar wave signal RWS1 is not subdued from being transmitted and when the radar wave signal RWS1 is subdued from being transmitted, and, it is not necessary to realize the switching device 141 when realizing this embodiment. Applications of this embodiment may also be realized through software, firmware, or hardware. In addition, the switching device 141 distinguishes the digital main signal Sp and the digital reference signal Sr by different time slots (e.g., "the radar wave signal RWS1 subdued from being transmitted" and "the radar wave signal RWS1 not subdued from being transmitted" are allocated at two different slots), and performs digital processing. For example, the radar wave signal may be operated in a pulse compression form, and the radar wave signal may be transmitted and received in a pulse form. Besides, the ADC 130 may be a non-continuous ADC for realizing the switching device 141, which performs digital processing on the radar wave signal RWS3 and the radar wave signal RWS2 at different time slots, and respectively generate the digital main signal Sp and the digital reference signal Sr at different time slots. The non-continuous ADC may be, for example, a successive-approximation ADC. The processor 142 in the digital processing unit 140 may include different circuit structures depending on different embodiments, for which reference may be made to the following embodiments.

Figure 3:
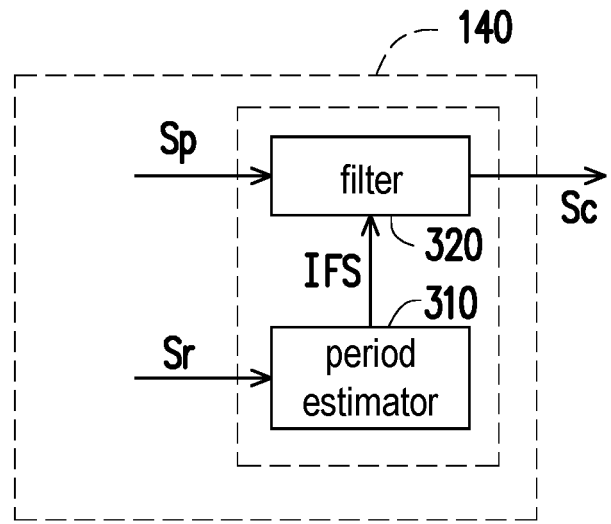
FIG. 3 is a functional block diagram of the digital processing unit according to the second embodiment of the disclosure.

FIG. 3 is a functional block diagram of the digital processing unit 140 according to the second embodiment of the disclosure. The digital processing unit 140 may include a period estimator 310 and a filter 320. The period estimator 310 and the filter 320 in this embodiment could be integrated in the processor 142 of FIG. 2. When the radar wave signal RWS1 is subdued from being transmitted, the period estimator 310 receives the digital reference signal Sr to estimate the fundamental frequency of at least one interference frequency component in the digital reference signal Sr, thereby generating an interference parameter IFS. In addition, when the radar wave signal RWS1 is not subdued from being transmitted, the filter 320 obtains the digital main signal Sp, and suppress the interference components at the estimated fundamental frequency and associated harmonic frequencies in the digital main signal Sp according to the interference parameter IFS, to generate a filtered digital signal Sc. The digital reference signal Sr mainly includes the interference components, and, the digital main signal Sp includes the interference components and the motion information for detecting the object at the same time. In this embodiment, the filter 320 may be realized by one or more notch filters. The notch filters may be configured to filter interference components of the fundamental frequency and interference components of the harmonic frequencies of the fundamental frequency. According to the interference parameter IFS, notch filters suppress the signal components corresponding interference at the estimated fundamental frequency and associated harmonic frequencies in the analog main signal or the digital main signal, to generate the filtered digital signal Sc.

Figure 4:
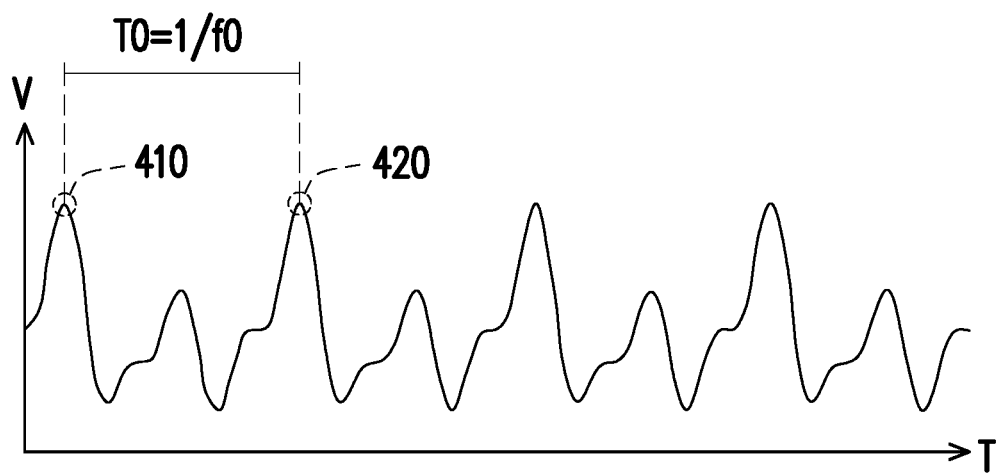
FIG. 4 is a schematic diagram of an example of the digital reference signal according to the second embodiment of the disclosure.
Figure 5:
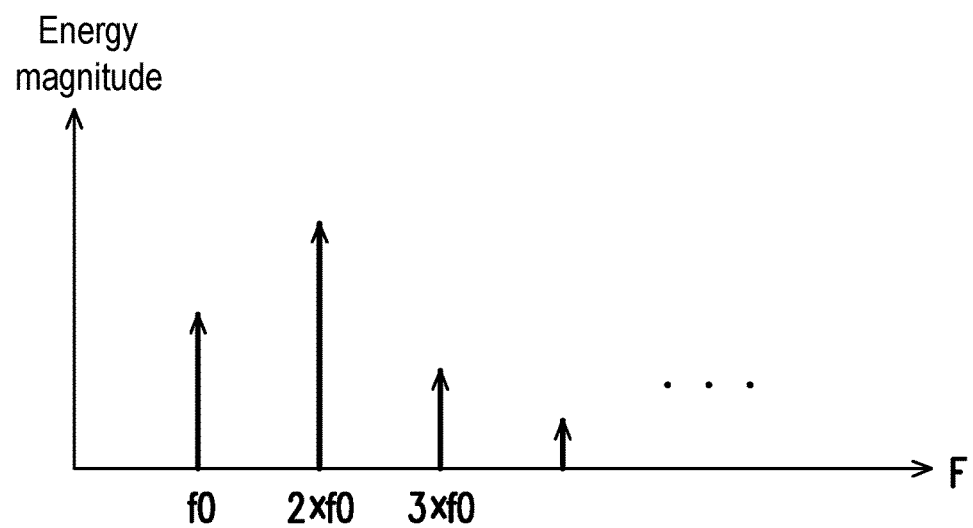
FIG. 5 is a schematic diagram of an example of the interference frequency and harmonic frequencies estimated from the digital reference signal according to the second embodiment of the disclosure.

FIG. 4 is a schematic diagram of an example of the digital reference signal Sr according to the second embodiment of the disclosure. FIG. 5 is a schematic diagram of an example of the interference frequency and harmonic frequencies estimated from the digital reference signal Sr according to the second embodiment of the disclosure. A horizontal axis in FIG. 4 represents a time index T of receiving the digital reference signal Sr, and a vertical axis in FIG. 4 represents a direct current voltage value corresponding to the time index T in the digital reference signal Sr. FIG. 5 shows the frequencies of interference components in the digital reference signal Sr. In FIG. 5, a horizontal axis is used to mark a frequency F, and a vertical axis represents a corresponding energy intensity. Herein, the digital reference signal Sr as shown in FIG. 4, and the fundamental frequency 'f0' and the harmonic frequencies '2×f0' and '3×f0' as shown in FIG. 5 are taken as examples. With reference to FIG. 3 to FIG. 5 together, since the digital reference signal Sr (as shown in FIG. 4) mainly includes a plurality of interference components, the period estimator 310 thus evaluates the fundamental and harmonic frequencies corresponding to information (i.e., the interference components) with relatively intense energy (e.g., the energy intensity greater than some value) in the digital reference signal Sr, such as the fundamental frequency 'f0', the harmonic frequencies '2×f0' and '3×f0', and so on in FIG. 5, and the period estimator 310 acquires the frequencies as the interference parameter IFS to be provided to the filter 320. To be specific, in FIG. 4, since an occurrence period between main interference components 410 and 420 is T0, the fundamental frequency 'f0' and the period T0 in FIG. 5 are thus reciprocal to each other (i.e., T0=1/f0).

Figure 6:
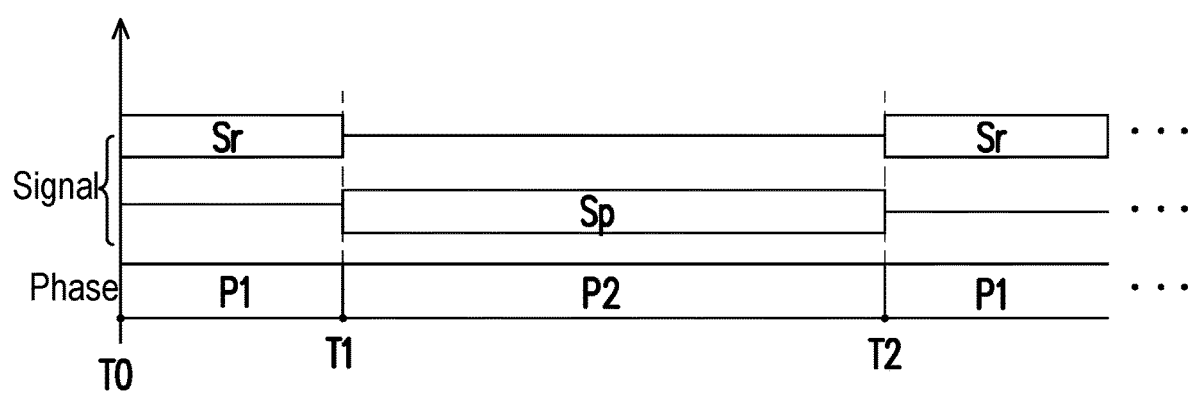
FIG. 6 is a diagram showing timings for operations of the period estimator and the filter while processing the digital reference signal and the digital main signal according to the second embodiment of the disclosure.

FIG. 6 is a diagram showing timings for operations of the period estimator 310 and the filter 320 while processing the digital reference signal Sr and the digital main signal Sp according to the second embodiment of the disclosure. A time point T0 represents a time point when the radar detector 100 is activated. At this time, since the radar wave signal RWS1 is subdued from being transmitted, the period estimator 310 thus receives the digital reference signal Sr to thereby evaluate the fundamental frequency 'f0', the harmonic frequencies '2×f0' and '3×f0', and so on, to generate the interference parameter IFS, which is herein referred to as an evaluation phase P1 of the interference estimation frequency. A time point T1 represents an end point of time of the evaluation phase P1 of the interference estimation frequency. A phase P2 may be entered immediately or later after the evaluation phase P1 of the interference estimation frequency. At this time, since the radar wave signal RWS1 is not subdued from being transmitted, the filter 320 thus performs filtering operation at the interference frequencies on the digital main signal Sp according to each estimated interference frequency in the interference parameter IFS, thereby suppressing the interference components and generating the filtered digital signal Sc. That is, the interference components in the digital main signal Sp may be suppressed or even eliminated by the operations of the period estimator 310 and the filter 320. After the phase P2 is ended, the evaluation phase P1 will be entered again immediately or later to evaluate the interference estimation frequency. The motion detector of FIG. 1 and FIG. 2 determines the motion of the object according to the filtered digital signal Sc.

Figure 7A:
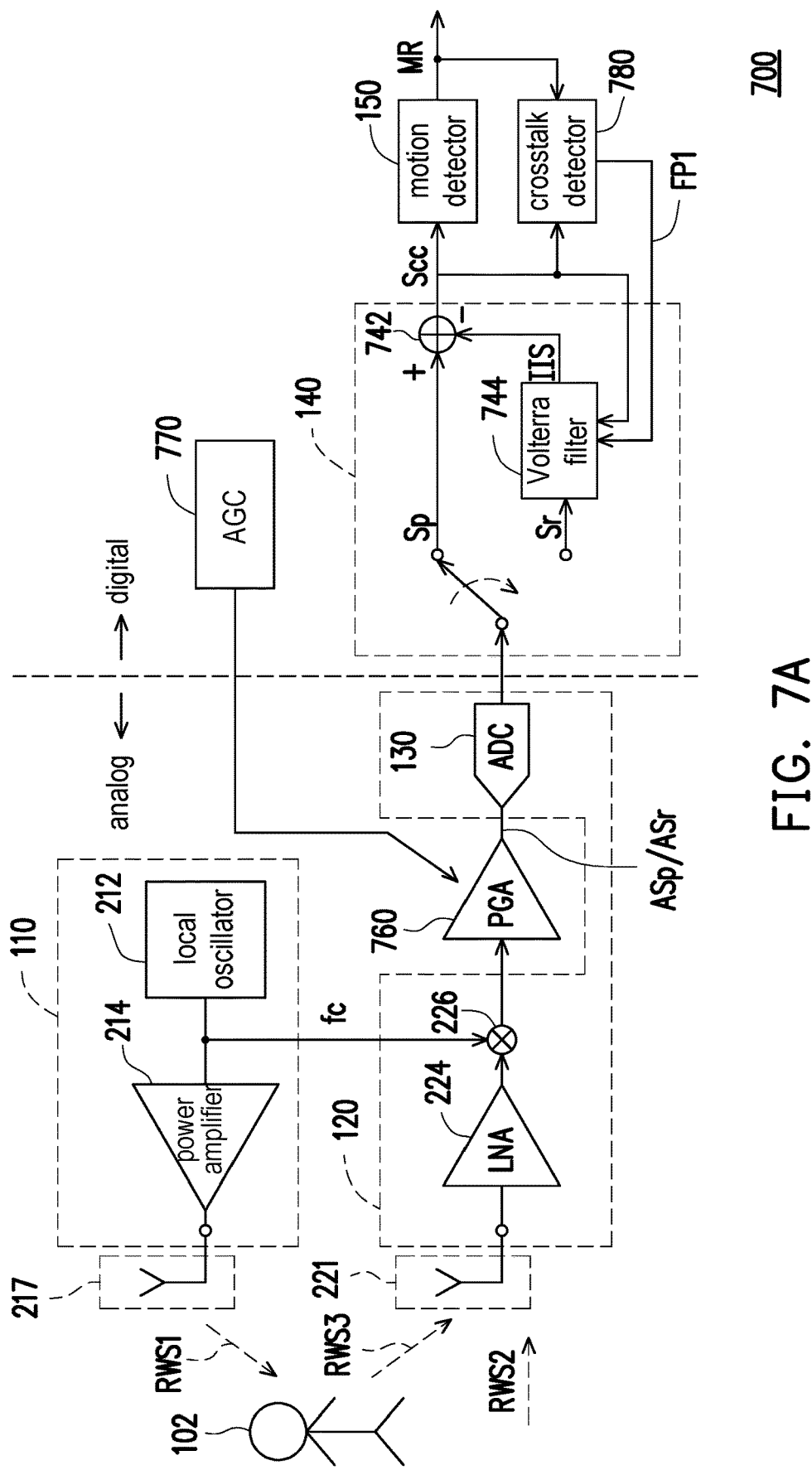
FIG. 7A is a detailed schematic diagram of a radar detector according to a third embodiment of the disclosure.
Figure 7B:
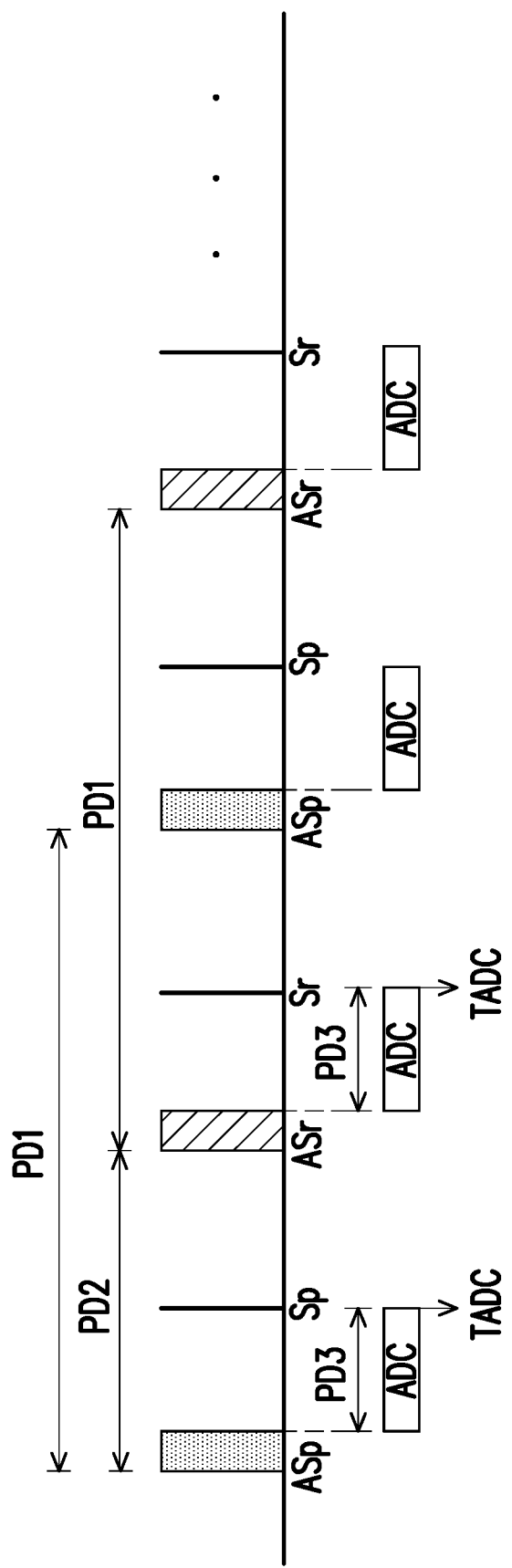
FIG. 7B is a diagram for describing timings of generating the digital reference signal and the digital main signal according to an embodiment of the disclosure.

According to the second embodiment of the disclosure, the digital processing unit 140 and the motion detector 150 may be realized by an integrated circuit, and the digital processing unit 140 mainly suppresses or eliminates the interference components in the digital main signal Sp through the period estimator 310 combined with the filter 320 of FIG. 3. In applications of this embodiment, other manners may also be adopted to suppress or eliminate the interference components in the digital main signal Sp or in the analog main signal. FIG. 7A is a detailed schematic diagram of a radar embodiment 700 according to a third embodiment of the disclosure. One of the main differences between the radar detector 700 of FIG. 7A and the radar detector 200 of FIG. 2 is on the sampling time instances of the digital reference signal Sr and the digital main signal Sp. In the embodiment of the disclosure shown in FIG. 7A and FIG. 8, the sampling of the digital main signal Sp and the sampling of the digital reference signal Sr occurs alternatively. The other differences lie in the design of the digital processing unit 140, and adding of a programmable gain amplifier (PGA) 760, an automatic gain controller (AGC) 770, and a crosstalk detector 780. FIG. 7B is a diagram for describing timings of generating the digital reference signal Sr and the digital main signal Sp according to the embodiment of the disclosure. When the radar wave signal RWS1 is subdued from being transmitted, the ADC 130 generates the digital reference signal Sr according to a corresponding analog reference signal ASr, and, when the radar wave signal RWS1 is not subdued from being transmitted, the ADC 130 generates the digital main signal Sp according to a corresponding analog main signal ASp. In this embodiment, operation of a pulse compression radar is adopted for description, and therefore, the radar wave signal is transmitted and received in a pulse form. The non-continuous ADC digitizes the analog reference signal ASr and the analog main signal ASp, in an interleaved manner. The switching device switches alternately between generating the digital reference signal Sr and the digital main signal Sp to generate two independent channels of digital signals, namely Sr and Sp, for a back-end digital signal processing unit (e.g., an interference canceller using an adaptive linear filter or a Volterra filter). An ADC sampling period of the analog reference signal ASr or of the analog main signal ASp is PD1, an ADC switching period of the reference signal Sr and the main signal Sp is PD2, and an operation period of the non-continuous ADC is PD3. In addition, the non-continuous ADC outputs the corresponding digital reference signal Sr or the corresponding digital main signal Sp at a time point TADC.

The radar detector 700 of FIG. 7A includes a subtractor 742 and an adaptive Volterra filter 744. The Volterra filter is a generic non-linear filter, which may be simplified as a linear filter when realized. Similar to the system operation of interference cancellation, the Volterra filter may be used as an interference canceller, take the digital reference signal Sr as an input, and generate the interference estimation signal IIS configured to be deducted from the digital main signal Sp. In an embodiment of a pulse compression radar, the generation of the digital reference signal Sr and the interference estimation signal IIS as well as the generation of the digital main signal occur at two consecutive radar pulse, and are switched by a switching device in an alternate manner.

When the radar wave signal RWS1 is subdued from being transmitted, the Volterra filter 744 receives the digital reference signal Sr and uses the previously updated Volterra coefficients to generate interference estimation signal IIS. The interference estimation signal IIS is held for being later deducted from the next digital main signal Sp. When the radar wave signal RWS1 is not subdued from being transmitted, the subtractor 742 deducts the held interference estimation signal IIS from the digital main signal Sp or the analog main signal, thereby suppressing the interference components in the digital main signal Sp or the interference components in the analog main signal. In this embodiment, when the radar wave signal RWS1 is not subdued from being transmitted, the digital main signal Sp is input at the positive receiving end of the subtractor 742, the previously held interference estimation signal IIS is input at a negative receiving end of the subtractor 742, and the Volterra coefficient update calculation is not performed. The output end of the subtractor 742 is the interference suppressed digital signal Scc, which is held and will be used as the estimation error signal for the Volterra coefficient update calculation at the next time slot when the radar wave signal RWS1 is subdued from being transmitted. When the radar wave signal RWS1 is subdued from being transmitted, the held interference suppressed digital signal Scc is taken as an estimation error signal and is used together with the digital reference signal Sr and the buffered data in the Volterra filter for the Volterra coefficient update calculation.

In this embodiment, the subtractor 742 is disposed in digital circuit or in a digital chip, and may directly deduct undesired components from the digital main signal Sp. For example, the interference estimation signal IIS is subtracted from the digital main signal Sp to generate an interference suppressed digital signal Scc, thereby suppressing the interference components in the digital main signal Sp. The motion detector 150 of FIG. 7A generates a motion detection result MR according to the interference suppressed digital signal Scc.

The crosstalk detector 780 is mainly configured to generate an update weight parameter FP1 of the Volterra coefficient update according to one or both of the digital main signal Sp and the interference suppressed digital signal Scc, and/or the motion detection result MR, and to provide the update weight parameter FP1 to a coefficient adjustment update unit of the Volterra filter 744. In the embodiment of FIG. 7A, for example, in a first mode (a general case), the crosstalk detector 780 outputs a relatively large update weight parameter FP1 so as to allow the interference suppressed digital signal Scc to be used in the Volterra coefficient adjustment update calculation; in a second mode, when the crosstalk detector 780 determines that the object moves or detects that an energy of the interference suppressed digital signal Scc is greater than a threshold according to the motion detection result MR, the crosstalk detector 780 does not perform the Volterra coefficient adjustment update calculation. For example, the crosstalk detector 780 may output 0 as the update weight parameter FP1.

The Volterra filter 744 adjusts the Volterra coefficients according to the update weight parameter FP1, to thereby dynamically adjust the interference estimation signal IIS with adaptive Volterra coefficient adaptation amount according to the digital reference signal Sr and the interference suppressed digital signal Scc, further indirectly or directly adjusting the digital main signal Sp. In this embodiment, the Volterra coefficients may be updated through a least-mean-square (LMS) algorithm or least-squares (LS) methods. In the embodiment of FIG. 7A, for example, the Volterra filter 744 adjusts the Volterra coefficients according to the update weight parameter FP1, to thereby dynamically adjust the interference estimation signal IIS according to the interference suppressed digital signal Scc, further directly adjusting the digital main signal Sp. In another embodiment, it is also possible to omit the crosstalk detector 780, and enable the Volterra filter 744 to directly adjust the Volterra coefficients in the Volterra filter 744 according to the interference suppressed digital signal Scc.

The PGA 760 is coupled between the frequency mixer 226 and the ADC 130. The PGA 760 is configured to amplify the analog reference signal or the analog main signal provided by the frequency mixer to the PGA 760 according to a programmable gain G. The automatic gain controller (AGC) 770 is coupled to the PGA 760. The automatic gain controller 770 determines the programmable gain G in the PGA 760 to prevent the interference signal components in the input of ADC 130 from overloading ADC 130 and to maintain an appropriate signal dynamic range so as to provide a good signal-to-quantization noise ratio (SQNR) in the output of ADC 130. In this embodiment, the PGA 760 is disposed in an analog circuit of the radar detector 700. In addition, since the automatic gain controller 770 adaptively adjusts the programmable gain G in the PGA 760 through a variety of conditions or digital signals, the automatic gain controller 770 may be disposed in the analog circuit or digital circuit of the radar detector 700.

Figure 8:
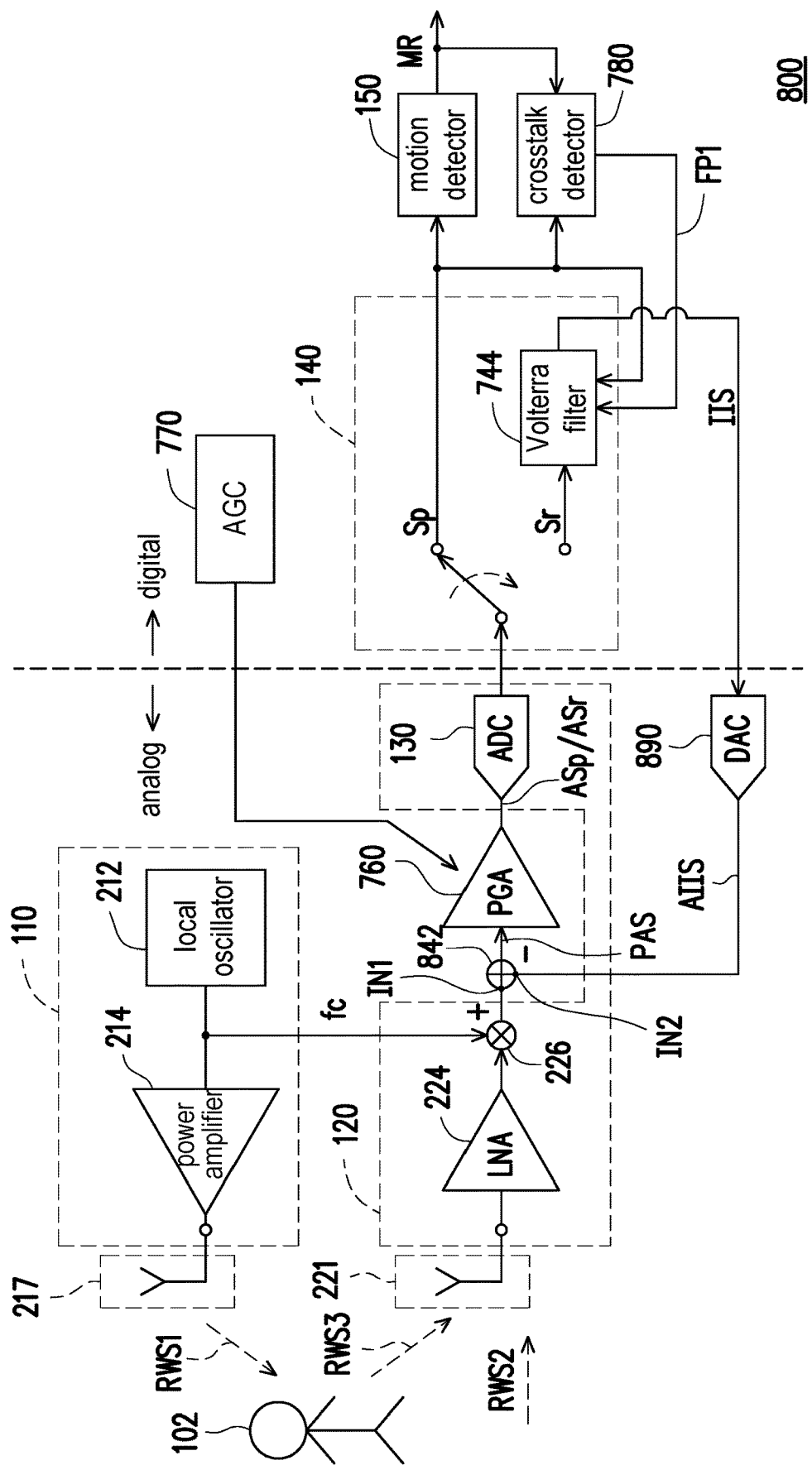
FIG. 8 is a detailed schematic diagram of a radar detector according to a fourth embodiment of the disclosure.

In FIG. 7A, the subtractor 742 is disposed in the digital circuit of the radar detector 700. Nonetheless, in applications of this embodiment, the subtractor may as well be disposed in the analog circuit of the radar detector 700, which is herein described with FIG. 8. FIG. 8 is a detailed schematic diagram of a radar detector 800 according to a fourth embodiment of the disclosure. The main difference between the radar detector 800 of FIG. 8 and the radar detector 700 of FIG. 7A lies in that a subtraction circuit 842 is disposed in the analog circuit instead of in the digital circuit. Besides, the radar detector 800 of FIG. 8 further includes a digital-to-analog converter (DAC) 890. The DAC 890 is configured to convert the interference estimation signal IIS of FIG. 8 from a digital form into an analog form to generate an analog interference estimation signal AIIS. The subtraction of the interference estimation signal IIS in analog circuit reduces the interference signal strength so that the signal dynamic range at the output of subtraction circuit 842 will not be dominated by the interference signal. The automatic gain controller (AGC) 770 properly adjusts the programmable gain G in the PGA 760 so as to have the signal dynamic range corresponding to the operation dynamic range for the input of the ADC 130 and provide a signal-to-quantization noise ratio (SQNR) for the output of ADC 130.

A positive receiving end IN1 of the subtraction circuit 842 is coupled to an output end of the frequency mixer 226 of the radar receiving device 120. A negative receiving end IN2 of the subtraction circuit 842 receives the analog interference estimation signal AIIS. In this embodiment, when the radar wave signal RWS1 is subdued from being transmitted, an output end PAS of subtraction circuit 842 receives a digital reference signal directly from the output end of the frequency mixer 226. The digital reference signal Sr is obtained accordingly from the PGA 760 and ADC 130 output based on the current PAS signal. The Volterra filter receives the digital reference signal Sr to generate the interference estimation signal IIS and the corresponding analog interference estimation signal AIIS is generated by the DAC 890. The digital and analog interference estimation signals IIS and AIIS are held for being subtracted later from the output of the frequency mixer 226 at the next time slot when the radar wave signal RWS1 is not subdued from being transmitted. When the radar wave signal RWS1 is not subdued from being transmitted, the positive receiving end IN1 of the subtraction circuit 842 receives an analog receive signal from the output end of the frequency mixer 226, and the negative receiving end IN1 of the subtraction circuit 842 receives the previously held analog interference estimation signal AIIS. The subtraction circuit 842 subtracts the previously held analog interference estimation signal AIIS from the analog receive signal at the output end of the frequency mixer 226 to generate a processed analog receive signal PAS as the analog main signal, in which the interference components are cancelled or suppressed. The analog main signal may be amplified by the PGA 760 and converted by the ADC 130 to form the digital main signal Sp. The ADC 130 converts the analog main signal (i.e., the processed analog receive signal PAS) into the digital main signal Sp when the radar wave signal RWS1 is not subdued from being transmitted, to correspondingly suppress the interference components in the digital main signal Sp or suppress the interference components in the analog main signal. The digital main signal Sp is an interference suppressed signal and used as the input of motion detector 150. In addition, the digital main signal Sp is stored as an interference estimation error signal later being used for Volterra coefficient update calculation. At the next time slot when the radar wave signal RWS1 is not subdued from being transmitted, the digital reference signal Sr and the stored estimation error signal are used to update Volterra coefficients.

In the embodiment of FIG. 8, for example, in a first mode (a general case), the crosstalk detector 780 provides a nonzero update weight parameter FP1 to the Volterra filter 744; in a second mode, when the crosstalk detector 780 determines that the object moves or detects that an energy of the digital main signal Sp is greater than a threshold according to the motion detection result MR, the crosstalk detector 780 disables Volterra coefficient update calculation, for example, the crosstalk detector 780 may output 0 as the update weight parameter FP1. The Volterra filter 744 adjusts the Volterra coefficients according to the update weight parameter FP1, to thereby dynamically adjust the interference estimation signal IIS according to the interference suppressed digital main signal Sp, further indirectly adjusting the future digital main signal Sp. FIG. 7B as the diagram for describing the timings of generating the digital reference signal Sr and the digital main signal Sp may also be applied to this embodiment, and the main difference lies in that when the radar wave signal RWS1 is subdued from being transmitted, the ADC 130 generates the digital reference signal Sr according to the corresponding analog reference signal ASr output by the subtraction circuit 842, and, when the radar wave signal RWS1 is not subdued from being transmitted, the ADC 130 generates the digital main signal Sp according to the corresponding analog main signal ASp output by the subtraction circuit 842. In this embodiment, the possibility of overload of the ADC 130 is reduced, and the automatic gain controller 770 is thus less likely to reduce the gain in the PGA 760. Therefore, even if the environmental interference is greater than the desired Doppler frequency offset information, the signal-to-quantization-noise ratio (SQNR) of the ADC 130 is still maintained. In another embodiment, it is also possible to selectively omit the disposing of PGA 760. Therefore, the ADC 130 of FIG. 7A may be directly coupled to the frequency mixer 226, or the ADC 130 of FIG. 8 may be directly coupled to the subtraction circuit 842.

Figure 9:
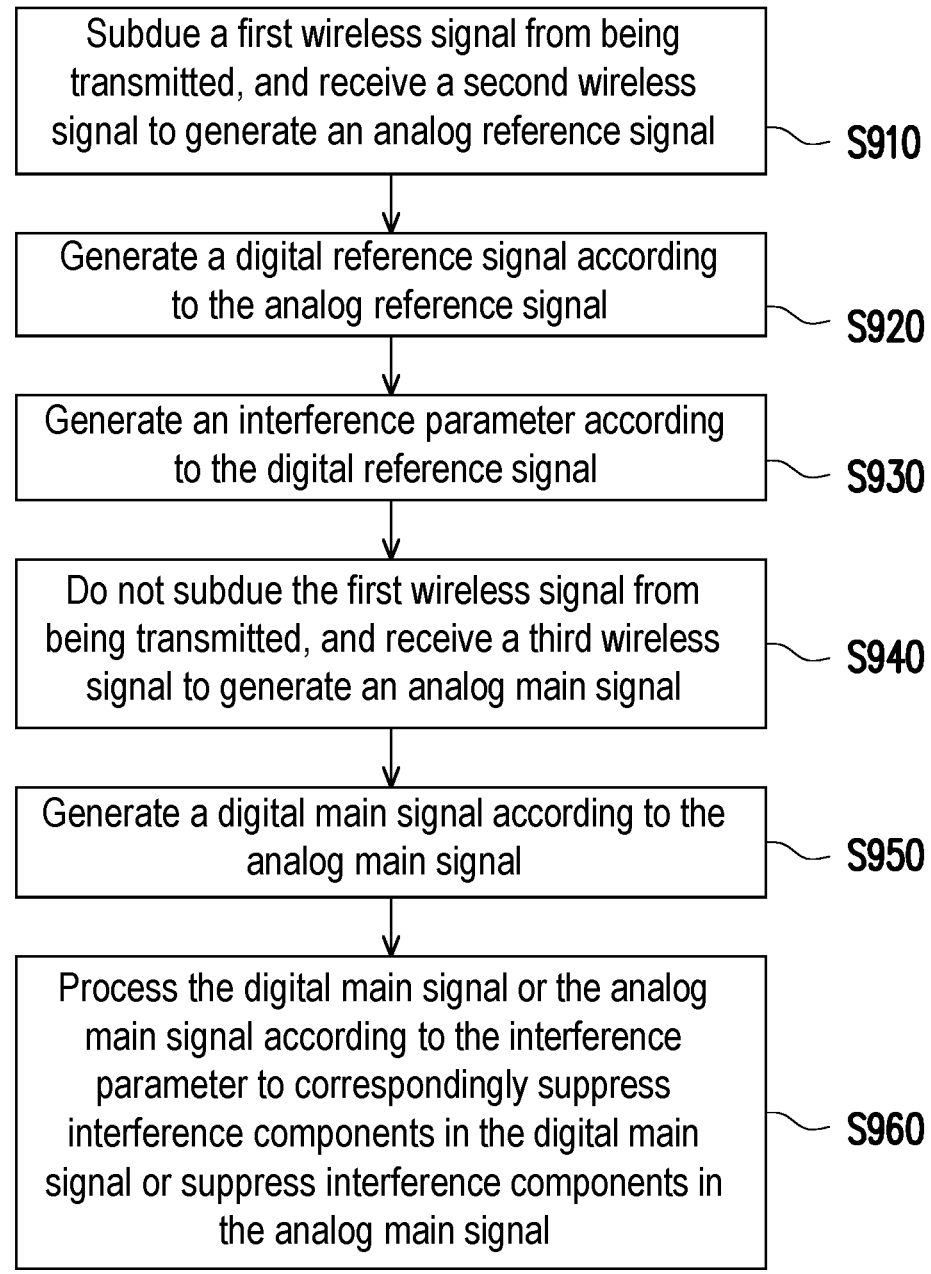
FIG. 9 is a flowchart describing an interference suppression method using a radar detector according to an embodiment of the disclosure.

FIG. 9 is a flowchart describing an interference suppression method using a radar detector according to an embodiment of the disclosure. The interference suppression method of FIG. 9 may be applied to the radar detectors 100, 200, 700, and 800 of FIG. 1, FIG. 2, FIG. 7A, and FIG. 8. Herein, the radar detector 100 of FIG. 1 and the interference suppression method of FIG. 9 are adopted as an example for description. In step S910, a first wireless signal (i.e., the radar wave signal RWS1) is subdued from being transmitted, and a second wireless signal (i.e., the radar wave signal RWS2) is received through the radar receiving device 120 to generate an analog reference signal. The radar wave signal RWS1 is transmitted by the radar transmitting device 110, and the radar wave signal RWS2 includes interference components corresponding to interference. In step S920, the ADC 130 generates a digital reference signal according to the analog reference signal. In step S930, the digital processing unit 140 generates an interference parameter according to the digital reference signal. In step S940, the radar wave signal RWS1 is not subdued from being transmitted, and a third wireless signal (i.e., the radar wave signal RWS3) is received to generate an analog main signal. The radar wave signal RWS3 may include motion information (e.g., Doppler frequency offset information) of an object and the interference components corresponding to the interference. In step S950, the digital processing unit 140 generates a digital main signal according to the analog main signal. In step S960, the digital processing unit 140 adjusts the digital main signal or the analog main signal according to the interference parameter, to correspondingly suppress the interference components in the digital main signal or suppress the interference components in the analog main signal. For details of steps S910 to S960, reference may be made to the foregoing embodiments.

In summary of foregoing, in the radar detector and interference suppression method using a radar detector according to the embodiment of the disclosure, when the radar wave signal (i.e., the first radar wave signal) is subdued from being transmitted, the interference components of the current environment is detected, and the degree of interference in the interference components is analyzed to generate the interference parameter. Moreover, when the radar wave signal (i.e., the first radar wave signal) is being transmitted, the received signal is appropriately adjusted through the interference parameter to reduce or suppress the interference in the original signal. Furthermore, in the disclosure, in the object detection radar detector applying a Doppler radar, not only the influence of AC narrowband interference is reduced, but also the antenna gain at the receiving antenna end of the radar is increased while the power consumption is reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A radar detector, comprising:
a radar transmitting device configured to transmit a first wireless signal;
a radar receiving device, coupled to the radar transmitting device, and configured to receive a second wireless signal to generate an analog reference signal in response to the first wireless signal is subdued from being transmitted, and receive a third wireless signal to generate an analog main signal in response to the first wireless signal is not subdued from being transmitted, wherein the second wireless signal and the third wireless signal comprise interference components corresponding to interference;
an analog-to-digital converter of which an input end is coupled to the radar receiving device to generate a digital reference signal according to the analog reference signal, and generate a digital main signal according to the analog main signal; and
a digital processing unit configured to generate an interference parameter according to the digital reference signal, and configured to adjust the digital main signal or the analog main signal according to the interference parameter, to correspondingly suppress the interference components in the digital main signal or suppress the interference components in the analog main signal.

2. The radar detector according to claim 1, wherein the digital processing unit comprises:
a period estimator; and
a filter;
wherein in response to the first wireless signal is subdued from being transmitted, the period estimator receives the digital reference signal to estimate the fundamental frequency of at least one interference frequency component to generate the interference parameter,
and in response to the first wireless signal is not subdued from being transmitted, the filter suppresses the interference components at the estimated fundamental frequency and associated harmonic frequencies in the digital main signal to generate a filtered digital signal.

3. The radar detector according to claim 2, further comprising:
a motion detector, coupled to the digital processing unit, the motion detector determining a motion of an object according to the filtered digital signal,
wherein in response to the first wireless signal is not subdued from being transmitted, the third wireless signal comprises a reflected signal that is the first wireless signal contacting and being reflected from the object.

4. The radar detector according to claim 1, further comprising a subtractor or a subtraction circuit, wherein the digital processing unit comprises:
a Volterra filter,
wherein in response to the first wireless signal is subdued from being transmitted, the Volterra filter receives the digital reference signal, and calculates the digital reference signal with an adaptive Volterra algorithm to obtain an interference estimation signal as the interference parameter,
and in response to the first wireless signal is not subdued from being transmitted, the subtractor or the subtraction circuit adjusts the digital main signal or the analog main signal according to the interference estimation signal from the interference parameter.

5. The radar detector according to claim 4, wherein the digital processing unit comprises the subtractor or the subtraction circuit, wherein
in response to the first wireless signal is not subdued from being transmitted, the subtractor or the subtraction circuit subtracts the interference estimation signal from the digital main signal to generate an interference suppressed digital signal.

6. The radar detector according to claim 5, further comprising:
a motion detector, the motion detector determining a motion of an object according to one of the digital main signal and the interference suppressed digital signal to generate a motion detection result,
wherein in response to the first wireless signal is not subdued from being transmitted, the third wireless signal comprises a reflected signal that is the first wireless signal contacting and being reflected from the object.

7. The radar detector according to claim 6, further comprising:
a crosstalk detector, the crosstalk detector generating an update weight parameter according to one of the digital main signal and the interference suppressed digital signal, and the motion detection result,
wherein the Volterra filter adjusts Volterra coefficients of the adaptive Volterra algorithm in the Volterra filter according to the update weight parameter.

8. The radar detector according to claim 5, wherein the Volterra filter adjusts Volterra coefficients of the adaptive Volterra algorithm in the Volterra filter according to the digital reference signal and the interference suppressed digital signal.

9. The radar detector according to claim 4, further comprising:
a digital-to-analog converter configured to convert the interference estimation signal from a digital form into an analog form,
wherein a first receiving end of the subtractor or the subtraction circuit is coupled to an output end of a frequency mixer of the radar receiving device, and a second receiving end of the subtractor or the subtraction circuit receives the interference estimation signal in the analog form,
in response to the first wireless signal is not subdued from being transmitted, the first receiving end of the subtractor or the subtraction circuit receives an analog receive signal from the output end of the frequency mixer, and the subtractor or the subtraction circuit subtracts the interference estimation signal in the analog form from the analog receive signal to generate a processed analog receive signal as the analog main signal,
and the analog-to-digital converter converts the analog main signal into the digital main signal.

10. The radar detector according to claim 1, wherein the radar transmitting device comprises:
a local oscillator configured to generate a radio-frequency carrier signal comprising a carrier frequency;
a power amplifier, wherein a receiving end of the power amplifier is coupled to the local oscillator to receive the radio-frequency carrier signal, and the power amplifier is configured to provide a modulation signal; and
a transmitting antenna end coupled to the power amplifier and configured to be controlled by the power amplifier to convert the modulation signal into the first wireless signal and transmit the first wireless signal.

11. The radar detector according to claim 10, wherein the radar receiving device comprises:
a receiving antenna end receiving the second wireless signal as a first analog signal in response to the first wireless signal is subdued from being transmitted, and receiving the third wireless signal as the first analog signal in response to the first wireless signal is not subdued from being transmitted;
a low noise amplifier coupled to the receiving antenna end and amplifying the first analog signal to form an amplified analog signal; and
a frequency mixer coupled to the low noise amplifier and the local oscillator in the radar transmitting device, wherein the frequency mixer performs down-conversion frequency mixing on the amplified analog signal according to the carrier frequency of the first wireless signal from the local oscillator, so as to generate the analog reference signal in response to the first wireless signal is subdued from being transmitted, and generate the analog main signal in response to the first wireless signal is not subdued from being transmitted.

12. The radar detector according to claim 11, further comprising:
a programmable gain amplifier (PGA) coupled between the frequency mixer and the analog-to-digital converter and configured to amplify the analog reference signal or the analog main signal according to a programmable gain; and
an automatic gain controller (AGC) coupled to the programmable gain amplifier,
wherein the automatic gain controller determines the programmable gain according to a signal strength and an overload of the analog-to-digital converter in the digital main signal or an overload of the analog-to-digital converter.

13. An interference suppression method using a radar detector, being adapted for a radar detector comprising a radar transmitting device and a radar receiving device, wherein the interference suppression method comprises:
subduing a first wireless signal from being transmitted, and receiving a second wireless signal to generate an analog reference signal, wherein the first wireless signal is transmitted by the radar transmitting device, and the second wireless signal comprises interference components corresponding to interference;
generating a digital reference signal according to the analog reference signal;
generating an interference parameter according to the digital reference signal;
not subduing the first wireless signal from being transmitted, and receiving a third wireless signal to generate an analog main signal, wherein the third wireless signal comprises interference components corresponding to the interference;
generating a digital main signal according to the analog main signal; and
adjusting the digital main signal or the analog main signal according to the interference parameter to correspondingly suppress the interference components in the digital main signal or suppress the interference components in the analog main signal.

14. The interference suppression method according to claim 13, wherein the step of subduing the first wireless signal from being transmitted comprises:
disabling the radar transmitting device;

reducing a transmission intensity of the first wireless signal; or shielding the first wireless signal wireless signal from the radar transmitting device or the radar receiving device.

15. The interference suppression method according to claim 13, wherein the step of generating the interference parameter according to the digital reference signal comprises:

evaluating at least one interference estimation frequency of the digital reference signal to generate the interference parameter.

16. The interference suppression method according to claim 15, wherein the step of adjusting the digital main signal or the analog main signal according to the interference parameter comprises:

suppressing the interference components at the estimated fundamental frequency and associated harmonic frequencies in the digital main signal to generate a filtered digital signal, and the interference suppression method further comprises:

determining a motion of an object according to the filtered digital signal, wherein in response to the first wireless signal is not subdued from being transmitted, the third wireless signal comprises a reflected signal that is the first wireless signal contacting and being reflected from the object.

17. The interference suppression method according to claim 13, wherein the step of generating the interference parameter according to the digital reference signal comprises:

calculating the digital reference signal with an adaptive Volterra algorithm to obtain an interference estimation signal as the interference parameter, the step of adjusting the digital main signal or the analog main signal according to the interference parameter comprises:

adjusting the digital main signal or the analog main signal according to the interference estimation signal, and the interference suppression method further comprises:

determining a motion of an object according to the digital signal that is adjusted, wherein in response to the first wireless signal is not subdued from being transmitted, the third wireless signal comprises a reflected signal that is the first wireless signal contacting and being reflected from the object.

18. The interference suppression method according to claim 17, wherein the step of adjusting the digital main signal or the analog main signal according to the interference estimation signal comprises:

subtracting the interference estimation signal from the digital main signal to generate an interference suppressed digital signal in response to the first wireless signal is not subdued from being transmitted, and determining a motion of an object according to one of the digital main signal and the interference suppressed digital signal to generate a motion detection result.

19. The interference suppression method according to claim 17, further comprising:

generating an update weight parameter according to one of the digital main signal and the interference suppressed digital signal, and the motion detection result, and adjusting Volterra coefficients in the Volterra filter according to the update weight parameter.

20. The interference suppression method according to claim 17, further comprising:

adjusting Volterra coefficients in the Volterra filter according to the interference suppressed digital signal.

* * * * *